United States Patent
Wang

(10) Patent No.: US 6,306,995 B1
(45) Date of Patent: Oct. 23, 2001

(54) POLYMERIZATION PROCESS

(75) Inventor: Jin-Shan Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/443,645

(22) Filed: Nov. 18, 1999

(51) Int. Cl.$^7$ ................................................ C08F 210/00
(52) U.S. Cl. ...................... 526/348; 526/171; 526/173; 526/147; 526/161
(58) Field of Search ................................. 526/171, 173, 526/147, 161, 348

(56) References Cited

PUBLICATIONS

Reetz et al., Macromol. Rapid Commun., 17, 383–388, 1996.*

* cited by examiner

Primary Examiner—David W. Wu
Assistant Examiner—Ling-Siu Choi
(74) Attorney, Agent, or Firm—Andrew J. Anderson

(57) ABSTRACT

A process for polymerization of vinyl monomers is described comprising (a) forming an initiator comprising an organic iodide compound by reacting an initiator precursor comprising an organic bromide or chloride compound with an inorganic iodide salt under phase transfer catalysis in the presence of a phase transfer agent, and (b) polymerizing vinyl monomers in the presence of the formed initiator and a polymerization catalyst comprising an onium salt. Most preferably, both the phase transfer agent and the polymerization catalyst comprise an onium salt. The present invention provides a novel method for living polymerization of vinyl monomers under phase transfer conditions, which provides a high level of macromolecular control over polymerization process and which leads to more uniform and more controllable polymeric products. Oil soluble monomers may be polymerized in organic solvent or water-organic two phase solvent systems, while water soluble monomers may be polymerized in water or water-organic two phase solvent systems.

26 Claims, No Drawings

POLYMERIZATION PROCESS

FIELD OF THE INVENTION

The present invention relates to novel "living" polymerization process, particularly to a "living" polymerization process under phase transfer conditions.

BACKGROUND OF THE INVENTION

Conventional chain polymerization of vinyl monomers usually consists of three main elemental reaction steps: initiation, propagation, and termination. Initiation stage involves creation of an active center from an initiator. Propagation involves growth of the polymer chain by sequential addition of monomer to the active center. Termination (including irreversible chain transfer) refers to termination of the growth of the polymer chain. Owing to the presence of termination and poorly controlled transfer reactions, conventional chain polymerization typically yields a poorly controlled polymer in terms of predicted polymer properties. Moreover, conventional chain polymerization processes mostly result in polymers with simple architectures such as linear homopolymer and linear random copolymer.

In 1950s, a so-called living polymerization was discovered by Szwarc (Szwarc, et al. J. Am. Chem. Soc. 78,2656 (1956)). Living polymerization was characterized by the absence of any kinds of termination or side reactions which might break propagation reactions. The most important feature of living polymerization is that one may control the polymerization process to design the molecular structural parameters of the polymer. Additional polymerization systems where the termination reactions are, while still present, negligible compared to propagation reaction have also been disclosed. As structural control can generally still be well achieved with such processes, they are thus often termed "living" or controlled polymerization (Wang, Macromolecules, 28, 7901 (1995)). In living and "living" (or controlled) polymerization, as only initiation and propagation mainly contribute to the formation of polymer, molecular weight can be predetermined by means of the ratio of consumed monomer to the concentration of the initiator used. The ratio of weight average molecular weight to number average molecular weight, i.e., molecular weight distribution (Mw/Mn), may accordingly be as low as 1.0. Moreover, polymers with the specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like. In terms of functionalization, such structures and architectures may include: telechlics, macromonomer, labeled polymer, and the like.

Over the past 40 years, a number of living/"living" polymerization processes have been developed. Examples of these polymerization processes include: anionic polymerization (Szwarc, J. Am. Chem. Soc. 78, 2656 (1956)), cationic polymerization (Sawamoto, Trends Polym. Sci. 1,111 (1993)), ring opening methathesis polymerization (Gillium and Grubbs, J. Am. Chem. Soc. 108, 733 (1986)), nitroxides-mediated stable radical polymerization (Solomon, U.S. Pat. No. 4,581,429 (1986), Georges, Macromolecules, 26,2987 (1993)), Cobalt complexes-mediated radical polymerization (Wayland, J. Am. Chem. Soc. 116, 7943 (1994)), and transition metal catalyzed atom transfer radical polymerization (Wang, U.S. Pat. No. 5,763, 548 (1998)).

Living/"living" polymerization processes have been successfully used to produce numerous specialty polymeric materials which have been found to be very useful in many applications. One example is the commercialization of styrenic thermoplastic elastomers such as styrene-b-butadiene-b-styrene triblock copolymers (SBS) by Shell chemicals and others. SBS is made by sequential anionic living polymerization of styrene and butadiene. However, except for living anionic polymerization of non-polar monomers such as styrene and dienes using alkyl lithium as an initiator, almost all of other living/"living" systems mentioned-above currently showed little promise for wide industrial commercialization, mainly due to high cost to industrially implement these processes. Thus, searching for practical living/"living" polymerization processes is a major challenge in the field of polymer chemistry and materials.

Alkyl halides have been used as initiator in several "living" polymerization systems. Sawamoto et al used a series of mixtures of alkyl halide and Lewis acid as initiating system in "living" cationic polymerization of vinyl ether, isobutylene, and styrene (Sawamoto, Trends Polym. Sci. 1,111 (1993)). However, these cationic polymerizations required very restricted conditions such as moisture and impurities free reaction systems. Ganyor et al disclosed that combination of certain alkyl iodide with conventional radical initiator such as AIBN induced a "living" polymerization of styrene, methyl methacrylate, and methyl acrylate (Gaynor et al. Macromolecules 28, 8051 (1995)). The discovery of transition metal catalyzed atom transfer radical polymerization (ATRP) by Wang represents a very important step towards practical "living" polymerization (Wang, J. Am. Chem. Soc., 117, 5614 (1995)). Using alkyl halide as an initiator and transition metal species as a catalyst, ATRP not only works well with a very broad variety of important vinyl monomers but also provides much easier pathway towards a variety of polymers with various structure and architectures. However, the use of heavy transition metal salts or complexes requires multi-step purification of the resultant polymers. Moreover, heavy transition metal salts or complexes are often toxic and not environmentally friendly. These drawbacks limit the wide implementation of current version ATRP process in industrial production.

An initiating system comprising an alkyl halide and an onium salt has been also found to be effective in promoting "living" polymerization. Reetz (Reetz et al. Macromol. Rapid Commun. 17, 383 (1996)) disclosed that while neither diethyl or dimethyl iodomethylmalonate nor tetra-n-butylammonium iodide alone initiated the polymerization of methyl methacrylate (MMA), a "living" polymerization of MMA was achieved by using diethyl or dimethyl iodomethylmalonate/tetra-n-butylammonium iodide (1/1) as an initiating system in polar solvents. The controlled poly (methyl methacrylate) was obtained in the number-average molecular weight range of 2000 to 8000, with molecular weight distribution being fairly narrow (ratio of weight- to number-average molecular weights Mw/Mn 1.2–1.3). Although the underlying mechanism is still unclear, the onium salt used acts as a catalyst in this homogenous polymerization system. In comparison with other "living" systems, the alkyl iodide/ammonium salt combined catalyst system disclosed by Reetz represents a simpler and cleaner one towards "living" polymerization. Due to the instability of iodide containing organic compounds, however, such process may not be commercially feasible, and it has been found that more stable alkyl chlorides or bromides alone are not reactive enough to react with onium salt to generate initiating species in chain polymerization.

Phase-transfer catalysis, PTC, was first coined by Starks in 1971 (J. Am. Chem. Soc., 93, 195 (1971)). It has been widely and practically used in various preparative organic, organometallic and polymer chemistry. PTC is a technique for conducting reactions between two or more reagents in one or two or more phases, when reaction is inhibited because the reactants cannot easily come together and one reagent is not reactive enough towards another one. A "phase-transfer agent" is added to transfer one of the reagents to a location where it can conveniently and rapidly react with another reagent. Two types of phase transfer agents are found efficient: quaternary salts and certain chelating reagents such as crown ethers, cryptands, poly (ethylene glycol) and their derivatives.

Traditional fields of polymer chemistry like radical, anionic and condensation polymerizations, as well as chemical modification of polymers, have substantially benefited from the use of phase transfer catalysis (Starks, Phase-Transfer Catalysis, ACS Symposium Series 326, 1987). Much work has been reported, e.g., on the use of phase transfer catalysis in condensation polymerization for the synthesis of polyester, polysulfonates, polyphosphonates, polysulfones, polythioesters, polyamides, polycarbonate, etc (see: Percec, in Phase-Transfer, Chapter 9, Starks Ed., ACS Symposium Series, Vol. 326 (1987)). It was often noticed that, in the absence of catalyst, only low molecular weight condensation polymer was produced even after long periods of time, whereas with the presence of the onium catalyst, high molecular weight of polymer was achieved after relatively short periods of time.

Phase transfer catalysis has been also used in chain polymerization. Rasmussen and co-workers have disclosed that many free radical polymerizations of acrylic monomers can be conducted in two-phase systems using potassium persulfate and either crown ethers or quaternary ammonium salts as initiators (Rasmussen et al. in, Phase-Transfer Catalysis, ACS Symposium Series 326, Starks Ed., p 116, 1987). When transferred to the organic phase, persulfate performs far more efficiently as an initiator than conventional initiators such as azobisisobutyronitrile or benzoyl peroxide. Photopolymerization of methyl methacrylate with quaternized ammonium salt-potassium thiocyanate-$CCl_4$ was also reported (Shimada, S. Polym. J. 30,152 (1998)). However, all disclosed polymerization processes under phase transfer conditions were not living or "living". The monomer conversion to polymer was often very low; molecular weight can not be controlled; and molecular weight distribution is very broad (Mw/Mn often more than 2).

It would be desirable to provide a novel method for living polymerization of vinyl monomers which provides a high level of macromolecular control over the polymerization process and which leads to more uniform and more controllable polymeric products. It would be especially desirable to provide such a living polymerization process with existing facility, which relies on readily available starting materials and catalysts.

None of the prior art discloses a process using phase transfer catalysis for living or "living" polymerization of vinyl monomers. Specially, none of the prior art discloses the use of organic halides as the initiator for living or "living" polymerization of monomers under phase transfer conditions.

SUMMARY OF THE INVENTION

In accordance with one embodiment of the invention, a process for polymerization of vinyl monomers is described comprising (a) forming an initiator comprising an organic iodide compound by reacting an initiator precursor comprising an organic bromide or chloride compound with an inorganic iodide salt under phase transfer catalysis in the presence of a phase transfer agent, and (b) polymerizing vinyl monomers in the presence of the formed initiator and a polymerization catalyst comprising an onium salt. In accordance with a particular embodiment of the present invention, a process for polymerization of vinyl monomers is disclosed, comprising polymerizing vinyl monomers in the presence of (i) an organic bromide or chloride compound, (ii) a phase transfer catalysis system comprising an inorganic iodide salt and a phase transfer agent, and (iii) a polymerization catalyst comprising an onimum salt. Most preferably, both the phase transfer agent and the polymerization catalyst comprise an onium salt.

The present invention provides a novel method for living polymerization of vinyl monomers under phase transfer conditions, which provides a high level of macromolecular control over polymerization process and which leads to more uniform and more controllable polymeric products. Oil soluble monomers may be polymerized in organic solvent or water-organic two phase solvent systems, while water soluble monomers may be polymerized in water or water-organic two phase solvent systems.

DETAILED DESCRIPTION OF THE INVENTION

In the context of the present invention, the term "living" refers to the ability to produce a product having one or more properties which are reasonably close to their predicted value. The polymerization is said to be "living" if the resulting number average molecular weight is close to the predicted molecular weight based on the ratio of the concentration of the consumed monomer to the one of the initiator; e.g., within an order of magnitude, preferably within a factor of five, more preferably within a factor of 3, and most preferably within a factor of two, and to produce a product having narrow molecular weight distribution as defined by the ratio of weight average molecular weight to number molecular weight (MWD); e.g., less than 10, preferably less than 2, more preferably less than 1.5, most preferably less than 1.2. Moreover, compared with conventional polymerization, the conversion of the monomer in "living" polymerization is higher, e.g., higher than 10%, preferably higher than 30%, more preferably higher than 50%, most preferably higher than 80%.

In the present invention, the organic bromide or chloride compound combined with the polymerization catalyst itself typically can not induce "living" polymerization as defined herein, or in many instances even polymerization. However, the phase transfer reaction between the organic bromide or chloride compound and an inorganic iodide salt in the presence of phase transfer agent leads to a novel species which can be catalyzed by the polymerization catalyst to generate the initiating species. Moreover, the presence of the catalyst ensures polymerization proceed in a "living" way.

As an initiator precursor organic bromide or chloride compound, any organic halide, R-X, can be selected where R is any organic moiety and X is Cl or Br. Examples of initiators include but are not limited to ethyl 2-bromoisobutyrate, diethyl 2-bromo-2-methylmalonate, 2-chloropropionitrile, 2-bromopropionitrile, 2-bromo-2- methylpropionic acid, 2-bromoisobutyrophone, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chlorine acetonitrile, tribromoethanol, tribromoacetyl chloride, trichloroacetyl chloride, tribromoacetyl bromide, chloroform, 1-phenyl ethylchloride, 1-phenyl ethylbromide, 2-chloropropionic acid, 2-bromoisobutyric acid, 4-vinyl benzene sulfonyl chloride, vinyl benzenechloride, 2-chloroisobutyrophenone, and 2-bromoisobutyrophenone.

Any inorganic iodide containing compound with the formula MI can be selected to react with R-X to form R-I under phase transfer catalysis (PTC) as illustrated in Scheme 1

Scheme 1

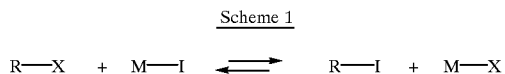

where M can be selected from the group containing metal ion such as Li, K, Na, Rb, Cs, Be, Ba, Sr, Ca, Mg.

Examples of inorganic iodide salts include but are not limited to sodium iodide, potassium iodide, lithium iodide, cesium iodide, calcium iodide.

The phase transfer catalyst used in the present invention are likewise well-known. They can be selected, e.g., from any phase transfer catalysts set forth in Starks, et al. *Phase-Transfer Catalysis, Fundamentals, Applications, and Industrial Perspectives,* Chapman & Hall, New York, 1994, or other resources. In general, phase transfer catalysts which may be used include any onium salts and chelating agents.

Various onium salts can be used as phase transfer catalysts in the present invention, which can be selected from the group with the formula $W^+X'^-$ where $W^+$ is a salt cationic onium ion group containing $N^+$, $P^+$, $S^+$, $As^+$, or $Sb^+$ element, and $X'^-$ is a counter-anion. Onium salt counter-anion $X'^-$ and can be selected, e.g., from the group consisting of $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2\text{-})_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, sulfate.

Preferred onium salts include but are not limited to: $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3+Br^-$, $C_{10}H_{20}NEt_3^+Br^-$, $C_{12}H_{25}NEt_3^{+Br-}$, $C_{16}H_{33}NEt_3^{+Br-}$, $C_6H_{13}PEt_3^{+Br-}$, $C_6H_5CH_2NEt_3^{+Br-}$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+1/2\,(PtCl_6)^-$, $Bu_4N^+PF_6^-$, $Bu_4N^+HSO_4^-$, $Bu_4N^{+[CH_3CH(OH)CO_2]^-}$, $Bu_4N^+NO_3^-$, $Bu_4N^+IO_4^-$, $Bu_4N^{+ReO_4^-}$, $Bu_4N^+BF_4^-$, $Bu_4N^{+[B(C_6H_5)_4]^-}$, $Bu_4N^+[CF_3SO_3]^-$,

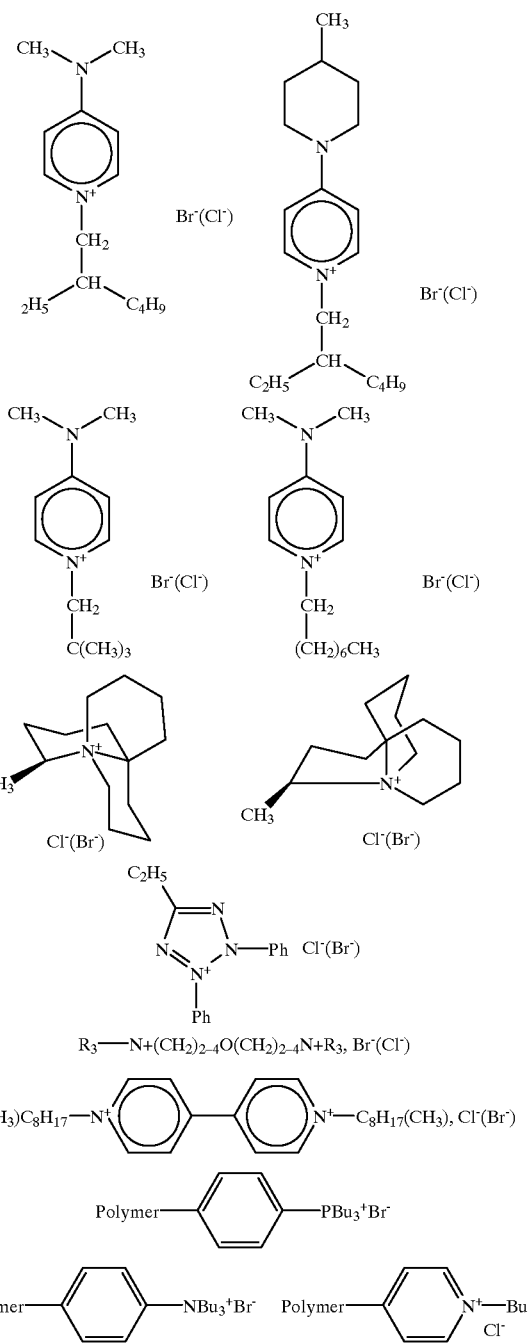

Any chelating agents which can facilitate the reaction between an inorganic salt M-I and an organic compound R-X as illustrated in Scheme 1 can alternatively be used in the present invention as phase transfer agent. Examples of these chelating agents include but are not limited to polyethylene glycol and derivatives such as $HO(CH_2CH_2O)_nH$ (n=2–600), $RO(CH_2CH_2O)H$ where R=$C_1$ to $C_{13}$ alkyl groups, $N(CH_2CH_2OCH_2CH_2OCH_3)_3$, $N(CH_2CH_2OCH_2CH_2OH)_3$, crown ethers and cryptands such as 18-crown-5, 15-crown-5, dibenzo-18-crown-6, dicyclohexano-18-crown-6, Kryptand 211, Kryptand 222, Kryptand 221.

The phase transfer reaction in Scheme 1 can be carried out before adding monomer and polymerization catalyst or during the course of the polymerization. Moreover, the phase transfer reaction in the present invention may be carried out in one, or more than one phases.

The inorganic iodide salt can be used in a total amount of 0.01 to 100 moles, preferably 0.1 to 10 moles, more preferably 0.2 to 5 moles, most preferably 0.4 to 3 moles per mole of the R-X initiator precursor.

Phase transfer catalyst can be used in a total amount of 0.01 to 100 moles, preferably 0.1 to 10 moles, more preferably 0.2 to 5 moles, most preferably 0.4 to 3 moles per mole of the initiator precursor.

Any onium salts described in *Phase-Transfer Catalysis, Fundamentals, Applications, and Industrial Perspectives* (Starks, et al. Chapman & Hall, New York, 1994) with the formula $W^+X'^-$ (where $W^+$ and $X'^-$ are as defined above) can be used as the polymerization catalyst in the present invention, such as described above with respect to phase transfer agents.

In the present invention, where an onium salt in the form of a quaternized monomer or monomers (e.g., 2-(dimethylamino)ethyl methacrylate, methyl chloride quaternized salt, and the like) is used as a phase transfer catalyst or "living" polymerization catalyst or both, "living" polymerization of quaternized monomer can be considered as a monomer self-catalyzed polymerization.

The onium salt catalyst can be used in a total amount of 0.01 to 100 moles, preferably 0.05 to 10 moles, more preferably 0.1 to 5 moles, most preferably 0.2 to 2 moles per mole of the formed R-I initiator.

In the present invention, polymers with various specifically desired structures and architectures can be purposely produced. In terms of topology, such structures and architectures may include: linear, star, comb, hyperbranched, dendritic, cyclic, network, and the like. In terms of sequence/composition distribution such structures and architectures may include: homopolymer, random copolymer, block copolymer, graft copolymer, gradient copolymer, tapered copolymer, periodic copolymer, alternating copolymer, and the like.

In the present invention, any vinyl monomers can be polymerized and/or copolymerized in the presence of the above-mentioned initiating system. Examples of the monomers include but not limited to: carboxyl group-containing unsaturated monomers such as acrylic acid, methacrylic acid, crotonic acid, itaconic acid, maleic acid, fumaric acid, and the like (preferably methacrylic acid), $C_{2-8}$ hydroxyl alkyl esters of (meth)acrylic acid (preferably methacrylic acid) such as 2-hydroxylethyl (meth)acrylate, 2-hydroxylpropyl (meth)acrylate, 3-hydroxypropyl (meth)acrylate, hydroxybutyl (meth)acrylate and the like, monomesters between a polyether polyol (e.g., polyethylene glycol, polypropylene glycol or polybutylene glycol) and an unsaturated carboxylic acid (preferably methacrylic acid); monoethers between a polyether polyol (e.g., polyethylene glycol, polypropylene glycol or polybutylene glycol) and a hydroxyl group-containing unsaturated monomers (e.g., 2-hydroxyl methacrylate); adducts between an unsaturated carboxylic acid and a monoepoxy compound; adducts between glycidyl (meth)acrylates (preferably methacrylate) and a monobasic acid (e.g., acetic acid, propionic acid, p-t-butylbenzonic acid or a fatty acid); monoesters or diesters between an acid anhydride group-containing unsaturated compounds (e.g., maleic anhydride or iraconic anhydride) and a glycol (e.g. ethylene glycol, 1,6-hexaediol or neopentyl glycol); chlorine-, bromine-, fluorine-, and hydroxyl group containing monomers such as 3-chloro-2-hydroxylpropyl (meth)acrylate (preferably methacrylate) and the like; $C_{1-24}$ alkyl esters or cycloalkyl esters of (meth)acrylic acid (preferably methacrylic acid), such as methyl methacrylate, ethyl methacrylate, propyl methacrylate, isopropyl methacrylate, n-, sec-, or t- butyl methacrylate, hexyl methacrylate, 2-ethylhexyl methacrylate, octylmethacrylate, decyl methacrylate, lauryl methacrylate, stearyl methacrylate, cyclohexyl methacrylate and the like, $C_{2-8}$ alkoxyalkyl esters of (meth)acrylic acid (preferably methacrylic acid), such as methoxybutyl methacrylate, methoxyethyl methacrylate, ethoxyethyl methacrylate, ethoxybutyl methacrylate and the like; olefines or diene compounds such as ethylene, propylene, butylene, isobutene, isoprene, chloropropene, fluorine containing olefins, vinyl chloride, and the like; ring-containing unsaturated monomers such as styrene and o-,m-,p-substitution products thereof such as N,N-dimethylaminostyrene, aminostyrene, hydroxystyrene, t-butylstyrene, carboxystyrene and the like, a-methyl styrene, phenyl (meth)acrylates, nitro-containing alkyl (meth)acrylates such as N,N-dimethyl-aminoethyl methacrylate, N-t-butylaminoethyl methacrylate; 2-(dimethylamino)ethyl methacrylate , methyl chloride quaternized salt, and the like; polymerizable amides such as (meth)acrylamide, N-methyl(meth)acrylamide, 2-acrylamido-2-methyl-1-propanesulfonic acid, and the like; nitrogen-containing monomers such as 2-, 4-vinyl pyridines, 1-vinyl-2-pyrrolidone, (meth)acrylonitrile, and the like; glycidyl group-containing vinyl monomers such as glycidyl (meth)acrylates and the like, vinyl ethers, vinyl acetate. These monomers can be used singly or as admixture of two or more than two.

Vinyl terminated macromonomers, such as any of those which are defined in "Chemistry and Industry of Macromonomers" (Yamashita, Huthig & Wepf, New York 1993), can also be used in the present invention. The preferable macromonomers are those terminated with methacrylate groups. Examples of such macromonomers include, but are not limited to, poly(ethylene oxide)methacrylate, poly (styrene)methacrylate, poly(siloxane)methacrylate, poly ((meth)acrylic acid) methacrylate, and poly(alkyloxazoline) methacrylate.

The above monomer or monomers can be used in a total amount of general 3–20,000 moles, preferably 5–2,000 moles, more preferably 10–1,000 moles per mole of the initiator precursor. The molecular weight distribution of resultant polymer (defined by the ratio of weight average molecular weight to number average molecular weight) in the present invention is generally from 1.01 to 30, mostly from 1.05 to 3.0, and more preferably less than 2.0.

Various organic or inorganic functional groups can be introduced to the ends of formed polymer or copolymer. By definition, a functional group is a moiety attached to a molecule that performs a function in terms of the reactivity and/or the physical properties of the molecule bearing it. Example of functional groups include but not limited to: halogens (e.g., Cl, Br, I), hydroxyl (—OH) groups such as —CH$_2$OH, —C(CH$_3$)$_2$0H, —CH(OH)CH$_3$, phenol and the like, thiol (—SH) groups, aldehyde (—CHO) and ketone (>C=O) groups, amine (—NH$_2$) groups, carboxylic acid and salt (—COOM) (M is H, alkali metal or ammonium), sulfonic acid and salt (—SO$_3$M) (M is H, alkali metal or ammonium), amide (—CONH$_2$), crown and kryptand, substituted amine (—NR$_2$) (R is H or C$_{1-18}$ alkyl), —C=CR', —CH=CHR'(R' is H or alkyl or aryl or alkaryl or aralkyl or combinations thereof), —COX (X is halogen), —CH$_2$N (SiR'$_3$)$_2$, —Si(OR')$_3$, —CN, —CH$_2$NHCHO, —B(OR)$_2$, —SO$_2$Cl, —N$_3$, —MgX. Functionalized polymer and copolymers including macromonomer prepared in accordance with the invention may be obtained by two ways: (a) one-pot synthesis using functional initiator; (b) transformation of living or preformed polymer to a desirable functional group by known organic reactions.

The addition order of various ingredients in according with the process of the invention can vary and generally do not affect the outcome of the "living" polymerization. In one particular embodiment, before adding monomer and polymerization catalyst, the initiator precursor, inorganic iodide compound, and phase transfer agent may be subjected to a preliminary reaction at the temperatures described hereafter for 30 seconds to 24 hrs.

The inventive process can be conducted between −70° C. and 200° C., preferably between 0° C. and 170° C., more preferably between 20° C. and 150° C., most preferably between 40° C. and 130° C.

Various polymerization technologies can be used to make the polymer, which include but not limited to: bulk polymerization, solution polymerization, emulsion polymerization, suspension polymerization, dispersion polymerization, precipitation polymerization, template polymerization, micro-emulsion polymerization. Various solvents can be used in the polymerization. Examples of the solvents are but not limited to: water, aliphatic solvent, aromatic solvent, hetero-atom containing solvent, supercritical solvent, and the like. Depending the expected molecular weight and other factors, polymerization time may vary from 10 seconds to 100 hours, preferably from 1 minute to 48 hrs, more preferably from 10 minutes to 24 hrs, most preferably from 30 minutes to 18 hrs.

The final polymer can be used as it is or is further purified, isolated, and stored. Purification and isolation may involve removing residual monomer, solvent, and catalyst. The purification and isolation process may vary. Examples of isolation of polymers include but not limited to precipitation, extraction, filtration, and the like. Final polymer product can also be used without further isolation such as in the form of the latex or emulsion.

Polymers prepared with the inventive process may be useful in a wide variety of applications. The examples of these applications are but not limited to: adhesives, dispersants, surfactants, emulsifiers, elastomers, coating, painting, thermoplastic elastomers, diagnostic and supporters, engineering resins, ink components, lubricants, polymer blend components, paper additives, biomaterials, water treatment additives, cosmetics components, antistatic agents, food and beverage packaging materials, release compounding agents in pharmaceuticals applications.

EXAMPLE 1

The following agents were weighed into an air-free flask equipped with a condenser and magnetic stirring bar under ambient atmosphere: 5 grams of methyl methacrylate, 5 ml of 1,3-dimethyltetrahydro-2(1H)pyrimidone(DMPU), 0.2 grams of ethyl 2-bromoisobutyrate (0.002 mol), 0.5 grams of deionized water, 0.5 grams of KI, and 0.3 grams of nBu$_4$NBr. After purging the solution with inert nitrogen gas for 15 minutes, the flask was placed in a pre-heated oil bath at 60° C. The polymerization was carried out at that temperature with stirring for 21.5 hours. Final polymer was precipitated from methanol and dried under vacuum at 60° C. The conversion of polymerization was 55% by means of 1H NMR. Number average molecular weight (Mn) is 4730 and the ratio of weight- to number-average molecular weight 1.55 by means of size exclusive chromatography (SEC). Theoretical Mn is 2750.

EXAMPLE 2

Comparative Example

The experiment was carried out under the same conditions as in Example 1 except for the absence of ethyl 2-bromoisobutyrate. After 20 hrs, the monomer conversion is zero according to 1H NMR data.

EXAMPLE 3

Comparative Example

The experiment was carried out under the same conditions as in Example 1 except for the absence of KI. After 20 hrs, the monomer conversion is zero according to 1H NMR data.

EXAMPLE 4

Comparative Example

The experiment was carried out under the same conditions as in Example 1 except for the absence of nBu$_4$NBr salt. After 20 hrs, the monomer conversion is zero according to 1H NMR data.

EXAMPLE 5

The experiment was carried out under the same conditions as in Example 1 except polymerization was run for 40 hours 15 minutes instead of 21.5 hours. The conversion of polymerization was 71% by means of 1H NMR. Number average molecular weight (Mn) is 5940 and the ratio of weight- to number-average molecular weight 2.0 by means of size exclusive chromatography (SEC). Theoretical Mn is 3550.

EXAMPLE 6

The following agents were weighed into an air-free flask equipped with a condenser and magnetic stirring bar under ambient atmosphere: 5 grams of methyl methacrylate, 5 ml of 1,3-dimethyltetrahydro-2(1H)pyrimidone(DMPU), 0.2 grams of ethyl 2-bromoisobutyrate (0.002 mol), 1.1 grams of 18-crown-6, 0.37 grams of KI, and 0.3 grams of nBu$_4$NBr. After purging the solution with inert nitrogen gas for 15 minutes, the flask was placed in a pre-heated oil bath at 60° C. The polymerization was carried out at that temperature with stirring and without light for 19 hours. Final polymer was precipitated from methanol and dried under vacuum at 60° C. The conversion of polymerization was 61% by means of 1H NMR. Number average molecular weight (Mn) is 23900 and the ratio of weight-to number-average molecular weight 1.51 by means of size exclusive chromatography (SEC). Theoretical Mn is 3500

EXAMPLE 7

The experiment was carried out under the same conditions as in Example 6, except for using 1.3 grams of tri(methoxyethoxy)ethylamine instead of 1.1 grams of 18-crown-6 and polymerization for 18.5 hours instead of 19 hours. The conversion of polymerization was 95% by means of 1H NMR. Number average molecular weight (Mn) is 16900 and the ratio of weight- to number-average molecular weight 1.28 by means of size exclusive chromatography (SEC). Theoretical Mn is 4750.

EXAMPLE 8

The following agents were weighted into a three necks round flask equipped with a condenser and magnetic stirring bar under ambient atmosphere: 10 grams of methyl methacrylate, 10 grams of 1,3-dimethyltetrahydro-2(1H) pyrimidone(DMPU), 0.4 grams of ethyl 2-bromoisobutyrate, 0.66 grams of KI, 2.6 grams of tris (methoxy ethoxy)ethylamine, and 0.6 grams of nBu$_4$NBr. After purging the solution with inert nitrogen gas for 15 minutes, the flask was covered and placed in a pre-heated oil bath at 75° C. At time intervals, an aliquot of polymer solution was picked out to determine the conversion by means of 1H NMR in CDC13. The final polymer was precipitated from methanol and dried under vacuum. The molecular weight and molecular weight distribution were determined by size exclusive chromatography (SEC) using polystyrene as a calibration standard. Results are shown in Table 1.

TABLE 1

| Time (hr) | Conversion % | $M_{n,cal}$ [a] | $M_{n,sec}$ | Mw/Mn, sec |
|---|---|---|---|---|
| 2 | 46 | | | |
| 6 | 79 | | | |
| 23.25 | 82 | 4100 | 16100 | 1.35 |

[a]Calculated molecular weight, $M_{n,cal}$ = (W$_{monomer}$)/[ethyl 2-bromoisobutyrate]$_0$ × conversion, where W$_{monomer}$ and [ethyl 2-bromoisobutyrate]$_0$ are initial weight of monomer and initial mole concentration of ethyl 2-bromoisobutyrate.

EXAMPLE 9

The experiment was carried out under the same conditions as in Example 8 except for using 0.5 grams of diethyl 2-bromomethylmalonate instead of 0.4 grams of ethyl 2-bromoisobutyrate. Results are shown in Table 2.

TABLE 2

| Time (hr) | Conversion % | $M_{n,cal}$ | $M_{n,sec}$ | Mw/Mn,sec |
|---|---|---|---|---|
| 2 | 45 | | | |
| 6 | 57 | | | |
| 23.25 | 67 | 3350 | 4190 | 1.33 |

EXAMPLE 10

The experiment was carried out under the same conditions as in Example 8 except for using 1 gram of CsI instead of 0.66 grams of KI. The conversion of polymerization for 23 hours was 43% by means of 1H NMR. Number average molecular weight (Mn) is 30600 and the ratio of weight- to number-average molecular weight 1.52 by means of size exclusive chromatography (SEC). Theoretical Mn is 2150.

EXAMPLE 11

The experiment was carried out under the same conditions as in Example 8 except for using 1 gram of poly(ethylene glycol) with molecular weight being 5000 from Aldrich instead of 2.6 grams of of tris(methoxy ethoxy)ethylamine. The conversion of polymerization for 23 hours was 72% by means of 1H NMR. Number average molecular weight (Mn) is 17800 and the ratio of weight- to number-average molecular weight 1.34 by means of size exclusive chromatography (SEC). Theoretical Mn is 3600.

EXAMPLE 12

The experiment was carried out under the same conditions as in Example 9 except for using 0.5 grams of n-butyl dimethylaminopyridium bromide instead of 0.6 grams of Bu$_4$NBr. The conversion of polymerization for 22.5 hours was 60% by means of 1H NMR. Number average molecular weight (Mn) is 4700 and the ratio of weight- to number-average molecular weight 1.31 by means of size exclusive chromatography (SEC). Theoretical Mn is 3000.

EXAMPLE 13

The experiment was carried out under the same conditions as in Example 8 except for using 0.4 grams of p-toluenesulfonyl chloride instead of 0.4 grams of ethyl 2-bromoisobutyrate and polymerization at 65° C. instead of 75° C. The conversion of polymerization for 22.5 hours was 51% by means of 1H NMR. Number average molecular weight (Mn) is 7200 and the ratio of weight- to number-average molecular weight 1.51 by means of size exclusive chromatography (SEC). Theoretical Mn is 2550.

EXAMPLE 14

The experiment was carried out under the same conditions as in Example 8 except for using 0.68 grams of Bu$_4$PBr instead of 0.6 grams of Bu$_4$NBr and polymerization at 60° C. instead of 75° C. The conversion of polymerization for 23 hours was 66% by means of 1H NMR. Number average molecular weight (Mn) is 5310 and the ratio of weight- to number-average molecular weight 1.56 by means of size exclusive chromatography (SEC). Theoretical Mn is 3300.

EXAMPLE 15

The experiment was carried out under the same conditions as in Example 8 except for using 0.74 grams of Bu$_4$NI instead of 0.6 grams of BU$_4$NBr and polymerization at 60° C. instead of 75° C. The conversion of polymerization for 23 hours was 91% by means of 1H NMR. Number average molecular weight (Mn) is 15800 and the ratio of weight- to number-average molecular weight 1.20 by means of size exclusive chromatography (SEC). Theoretical Mn is 4500.

EXAMPLE 16

The experiment was carried out under the same conditions as in Example 8 except for using 0.6 grams of Bu$_4$N(OAc) instead of 0.6 grams of Bu$_4$NBr and polymerization at 60° C. instead of 75° C. The conversion of polymerization for 23 hours was 36% by means of 1H NMR. Number average molecular weight (Mn) is 6570 and the ratio of weight- to number-average molecular weight 1.70 by means of size exclusive chromatography (SEC). Theoretical Mn is 1800.

EXAMPLE 17

The experiment was carried out under the same conditions as in Example 8 except for using 0.74 grams of BU$_4$N[B(C$_6$H$_5$)$_4$] instead of 0.4 grams of ethyl 2-bromoisobutyrate and polymerization at 60° C. instead of 75° C. The conversion of polymerization for 24 hours was 71% by means of 1H NMR. Number average molecular weight (Mn) is 6620 and the ratio of weight- to number-average molecular weight 1.53 by means of size exclusive chromatography (SEC). Theoretical Mn is 3550.

EXAMPLE 18

The experiment was carried out under the same conditions as in Example 8 except for using 0.18 grams of 2-chloropropionitrile instead of 0.4 grams of ethyl 2-bromoisobutyrate and polymerization at 60° C. instead of 75° C. The conversion of polymerization for 23 hours was 73% by means of 1H NMR. Number average molecular weight (Mn) is 5820 and the ratio of weight- to number-average molecular weight 1.47 by means of size exclusive chromatography (SEC). Theoretical Mn is 3630.

EXAMPLE 19

The experiment was carried out under the same conditions as in Example 9 except for using 0.65 grams of tetrabutylammonium tetrafluoroborate instead of 0.6 grams of $Bu_4NBr$ and polymerization at 60° C. instead of 75° C. The conversion of polymerization for 24 hours was 75% by means of 1H NMR. Number average molecular weight (Mn) is 5320 and the ratio of weight- to number-average molecular weight 1.32 by means of size exclusive chromatography (SEC). Theoretical Mn is 3750.

EXAMPLE 20

The experiment was carried out under the same conditions as in Example 8 except for using 0.20 grams of 2-bromoisobutyric acid instead of 0.4 grams of ethyl 2-bromoisobutyrate and polymerization at 60° C. instead of 75° C. The conversion of polymerization for 23 hours was 53% by means of 1H NMR. Number average molecular weight (Mn) is 7820 and the ratio of weight- to number-average molecular weight 1.70 by means of size exclusive chromatography (SEC). Theoretical Mn is 2650.

The invention has been described in detail with particular reference to preferred embodiments thereof, but it is to be understood that variations and modifications can be effected within the spirit and scope of the invention.

What is claimed is:

1. A process for polymerization of vinyl monomers, comprising (a) forming an initiator comprising an organic iodide compound by reacting an initiator precursor comprising an organic bromide or chloride compound with an inorganic iodide salt under phase transfer catalysis in the presence of a phase transfer agent, and (b) polymerizing vinyl monomers in the presence of the formed initiator and a polymerization catalyst comprising an onium salt, wherein the vinyl monomers comprise methacrylic acid; $C_{2-8}$ hydroxyl alkyl esters of methacrylic acid; monoesters between a polyether polyol and methacrylic acid; monoethers between a polyether polyol and 2-hydroxyl methacrylate; adducts between glycidyl methacrylate and a monobasic acid; chlorine-, bromine-, fluorine-, or hydroxyl group containing methacrylate monomers; $C_{1-24}$ alkyl esters or cycloalkyl esters of methacrylic acid; $C_{2-18}$ alkoxyalkyl esters of methacrylic acid; phenyl methacrylates, nitro-containing alkyl methacrylates; methacrylamides; methacrylonitrile; glycidyl methacrylates; or a methacrylate group terminated macromonomer.

2. The process of claim 1, wherein the initiator precursor comprises ethyl 2-bromoisobutyrate, diethyl 2-bromo-2-methylmalonate, 2-chloropropionitrile, 2-bromopropionitrile, 2-bromo-2-methylpropionic acid, 2-bromoisobutyrophone, 2-bromoisobutyryl bromide, 2-chloroisobutyryl chloride, α-bromo-α-methyl-γ-butyrolactone, p-toluenesulfonyl chloride and its substituted derivatives, 1,3-benzenedisulfonyl chloride, carbon tetrachloride, carbon tetrabromide, chlorine acetonitrile, tribromoethanol, tribromoacetyl chloride, trichloroacetyl chloride, tribromoacetyl bromide, chloroform, 1-phenyl ethylchloride, 1-phenyl ethylbromide, 2-chloropropionic acid, 2-bromoisobutyric acid, 4-vinyl benzene sulfonyl chloride, vinyl benzenechloride, 2-chloroisobutyrophenone, or 2-bromoisobutyrophenone.

3. The process of claim 1, wherein the inorganic iodide salt is of the formula MI where M is Li, K, Na, Rb, Cs, Be, Ba, Sr, Ca, or Mg.

4. The process of claim 1, wherein the inorganic iodide salt comprises sodium iodide, potassium iodide, lithium iodide, cesium iodide, or calcium iodide.

5. The process of claim 1, wherein the phase transfer agent comprises an onium salt or a chelating agent.

6. The process of claim 1, wherein the phase transfer agent comprises a chelating agent.

7. The process of claim 1, wherein the phase transfer agent comprises polyethylene glycol, a crown ether, a cryptand, or a derivative thereof.

8. The process of claim 1, wherein the phase transfer agent comprises polyethylene glycol, $HO(CH_2CH_2O)_nH$ where n=2–600, $RO(CH_2CH_2O)H$ where R represents a $C_1$ to $C_{13}$ alkyl group, $N(CH_2CH_2OCH_2CH_2OCH_3)_3$, $N(CH_2CH_2OCH_2CH_2OH)_3$, 18-crown-5, 15-crown-5, dibenzo-18-crown-6, dicyclohexano-18-crown-6, cryptand 211, cryptand 222, or cryptand 221.

9. The process of claim 1, wherein the phase transfer agent comprises an onium salt.

10. The process of claim 9, wherein the phase transfer agent and polymerization catalyst comprise the same onium salt.

11. The process of claim 10, wherein the onium salt comprises a compound of the formula:

$$W^+X'^+$$

where $W^+$ is a cationic onium ion group containing $N^+$, $P^+$, $S^+$, $As^+$, or $Sb^+$ element, and $X'^-$ is a counter-anion comprising $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, or sulfate.

12. The process of claim 10, wherein the onium salt comprises $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3^+Br^-$, $C_{10}H_{20}NEt_3^+Br^-$, $C_{16}H_{25}NEt_3^+Br^-$, $C_6H_{33}NEt_3^+Br^-$, $C_6H_{13}PEt_3^+Br^-$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+1/2(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$,

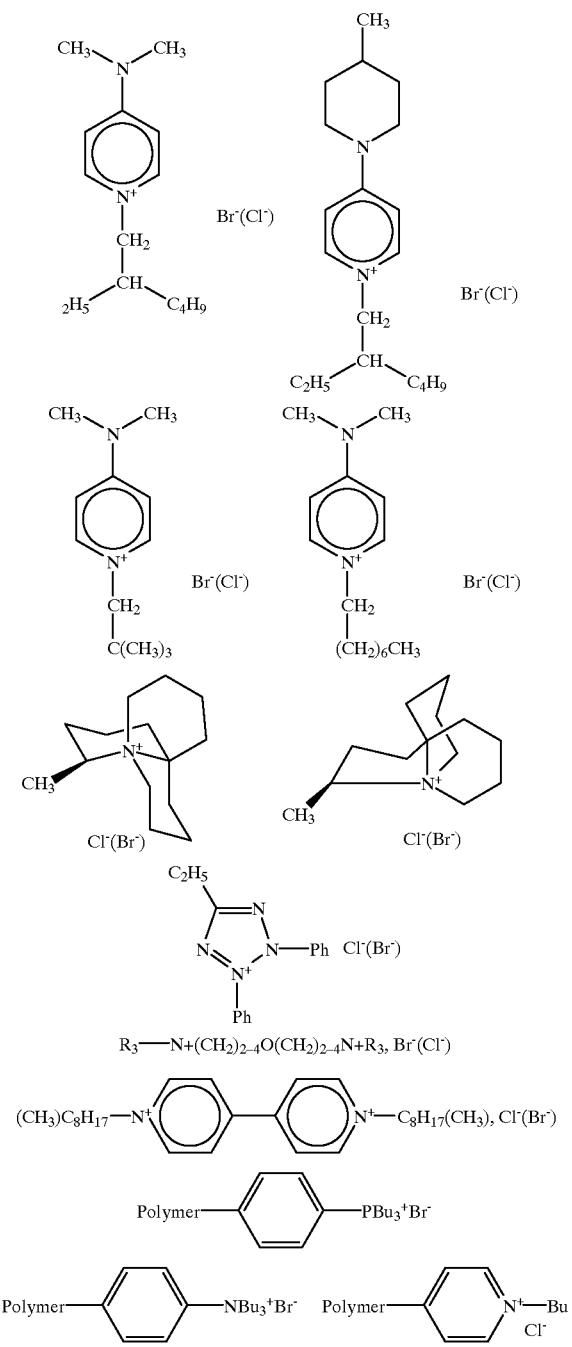

13. The process of claim 1, wherein the polymerization catalyst onium salt comprises a compound of the formula:

$$W^+ X'^-$$

where $W^+$ is a cationic onium ion group containing $N^+$, $P^+$, $S^+$, $As^+$, or $Sb^+$ element, and $X'^-$ is a counter-anion comprising $Cl^-$, $Br^-$, $I^-$, $NO_3^-$, $NO_2^-$, $ClO_3^-$, $BrO_3^-$, $IO_3^-$, $ClO_4^-$, $MnO_4^-$, $ReO_4^-$, $IO_4^-$, $CrO_4^{-2}$, nolybdate, tungstate, vanadate, borate, $SO_4^{-2}$, $S^{-2}$, $S_2O_3^{-2}$, arsentite, arsenate, selenite, tellurite, $(CO_2^-)_2$, $CO_3^{-2}$, $F^-$, $CH_3CO_2^-$, $C_6H_5CO_2^-$, $SCN^-$, $MeSO_3^-$, $N_3^-$, $Br_3^-$, $OH^-$, $CN^-$, picrate, nitrate, acetate, or sulfate.

14. The process of claim 1, wherein step (a) is performed prior to addition of monomers and polymerization step (b).

15. The process of claim 1, wherein step (a) is performed in situ after addition of monomers and concurrent with polymerization step (b).

16. The process of claim 1, wherein the inorganic iodide salt is used in a total amount of 0.1 to 10 moles per mole of the initiator precursor.

17. The process of claim 1, wherein the phase transfer catalyst is used in a total amount of 0.1 to 10 moles per mole of the initiator precursor.

18. The process of claim 1, wherein the onium salt catalyst is used in a total amount of 0.05 to 10 moles per mole of the initiator precursor.

19. The process of claim 1, wherein the monomers are used in a total amount of from 3–20,000 moles per mole of the initiator precursor.

20. A process for polymerization of vinyl monomers comprising polymerizing vinyl monomers in the presence of (i) an organic bromide or chloride compound, (ii) a phase transfer catalysis system comprising an inorganic iodide salt and a phase transfer agent, and (iii) a polymerization catalyst comprising an onium salt, wherein the vinyl monomers comprise methacrylic acid, $C_{2-8}$ hydroxyl alkyl esters of methacrylic acid; monoesters between a polyether polyol and methacrylic acid; monoethers between a polyether polyol and 2-hydroxyl methacrylate; adducts between glycidyl methacrylate and a monobasic acid; chlorine-, bromine-, fluorine-, or hydroxyl group containing methacrylate monomers; $C_{1-24}$ alkyl esters or cycloalkyl esters of methacrylic acid; $C_{2-18}$ alkoxyalkyl esters of methacrylic acid; phenyl methacrylates, nitro-containing alkyl methacrylates; methacrylamides; methacrylonitrile; glycidyl methacrylates; or a methacrylate group terminated macromonomer.

21. The process of claim 20, wherein the phase transfer agent comprises an onium salt or a chelating agent.

22. The process of claim 20, wherein the phase transfer agent and polymerization catalyst comprise the same onium salt.

23. The process of claim 20, wherein the vinyl monomers comprise methyl methacrylate, ethyl methacrylate, propyl methacrylate, isopropyl methacrylate, n-, sec-, or t-butyl methacrylate, hexyl methacrylate, 2-ethylhexyl methacrylate, octyl methacrylate, decyl methacrylate, lauryl methacrylate, stearyl methacrylate, or cyclohexyl methacrylate.

24. The process of claim 20, wherein the vinyl monomers comprise methyl methacrylate.

25. The process of claim 1, wherein the vinyl monomers comprise methyl methacrylate, ethyl methacrylate, propyl methacrylate, isopropyl methacrylate, n-, sec-, or t-butyl methacrylate, hexyl methacrylate, 2-ethylhexyl methacrylate, octyl methacrylate, decyl methacrylate, lauryl methacrylate, stearyl methacrylate, or cyclohexyl methacrylate.

26. The process of claim 1, wherein the vinyl monomers comprise methyl methacrylate.

* * * * *

UNITED STATES PATENT AND TRADEMARK OFFICE
CERTIFICATE OF CORRECTION

PATENT NO. : 6,306,995 B1
DATED : October 23, 2001
INVENTOR(S) : Jin-Shan Wang

It is certified that error appears in the above-identified patent and that said Letters Patent is hereby corrected as shown below:

Column 14,
Line 36, replace "$W^+X'^+$" with -- $W^+X'^-$ --
Line 52, replace "$C_{16}H_{25}NEt_3^+Br^-$, $C_6H_{33}NEt_3^+Br^-$" with -- $C_{12}H_{25}NEt_3^+Br^-$, $C_{16}H_{33}NEt_3^+Br^-$, --

Signed and Sealed this

Eleventh Day of March, 2003

JAMES E. ROGAN
*Director of the United States Patent and Trademark Office*